Feb. 23, 1965 P. G. IVANCHICH 3,170,338
STEERING GEAR
Filed Dec. 20, 1962
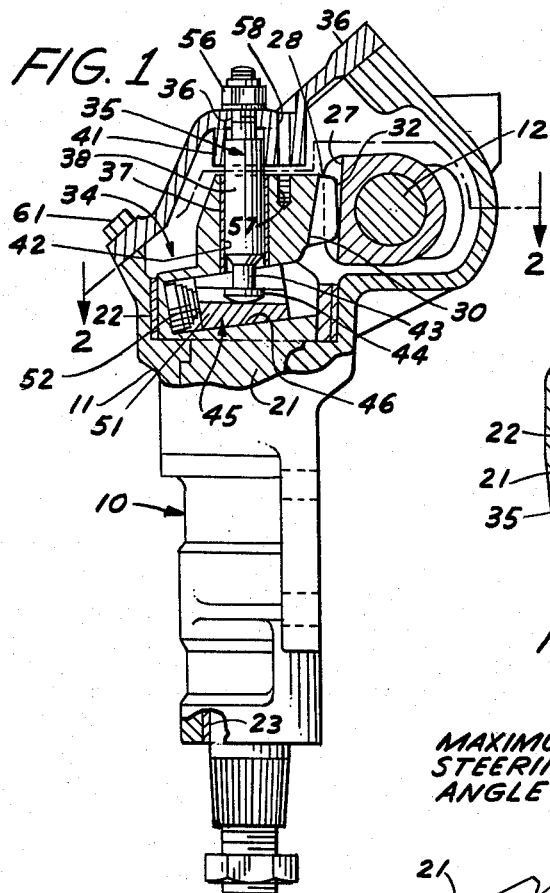
FIG. 1
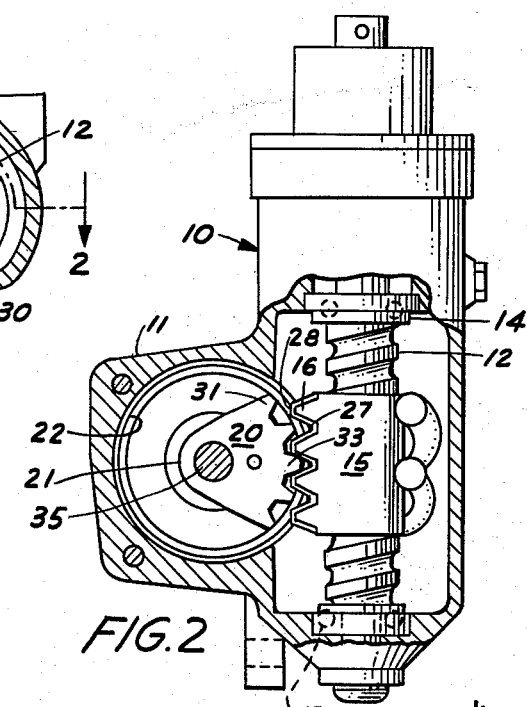
FIG. 2
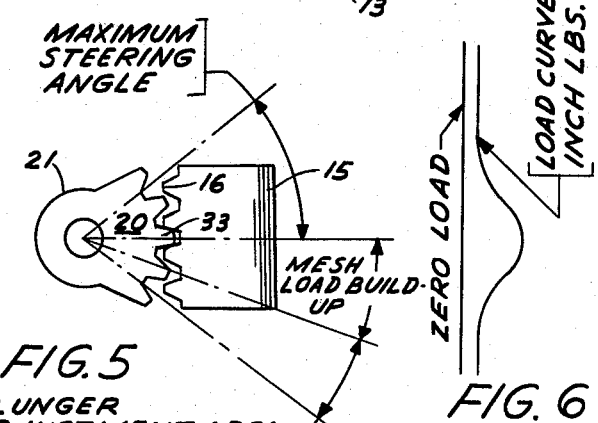
FIG. 5
PLUNGER ADJUSTMENT AREA
FIG. 6
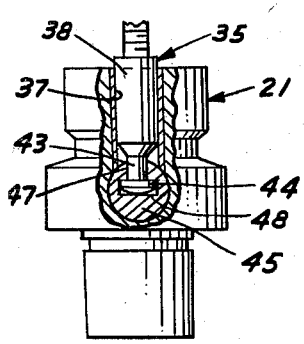
FIG. 3
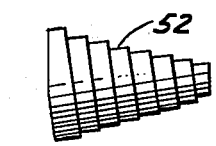
FIG. 4
INVENTOR.
PETER G. IVANCHICH
BY J.R. Faulkner
K.L. Zerschling
ATTORNEYS 3,170,338
STEERING GEAR
Peter G. Ivanchich, Dearborn, Mich., assignor to Ford Motor Company, Dearborn, Mich., a corporation of Delaware
Filed Dec. 20, 1962, Ser. No. 246,135
8 Claims. (Cl. 74—499)

This invention relates to a steering gear and more particularly to a steering gear in which means are provided for automatically adjusting the lash and meshload in the steering gears to proper values as the gears wear through usage.

It is desirable in steering gears to maintain the teeth of the mating gears in a no-lash condition when the steering gear is in the on-center position. As the operator of the vehicle moves the steering wheel to provide either a left or a right turn, it is desirable to have a certain amount of preset lash in the gears at these positions. This arrangement provides a meshload between the gear teeth that is highest in the on-center position and that tapers off as the gear is turned to either the left or right of center. This varying meshload is felt by the vehicle driver as a varying torque required to turn the steering wheel. The torque required to turn the steering wheel is highest at the on-center position and falls off rapidly as the wheel is turned to either the right or left.

In such an arrangement, steering is relatively stable when the gears are in an on-center position and response is fast and quick when the steering gear is turned to either the left or the right. In conventional automotive vehicle steering gears the lash is set at the factory, and this is accomplished by means of a stud that is threaded into the housing of the steering gear. This stud extends into one of the shafts and as the stud is turned in the housing it forces the teeth of the steering gear into a no-lash position when the steering gear is set in the on-center position. This arrangement suffers from the disadvantage that the lash in the gear set will increase and the meshload of the gears will decrease as the teeth of the gears wear. When this occurs steering control becomes unstable and inaccurate. The owner of the vehicle should return it for service so that the lash may again be set by the procedure described above.

The present invention provides a mechanism for automatically performing this adjustment in a very satisfactory manner. This means includes a force multiplication means, preferably in the form of a wedge, that is positioned within the output or sector gear shaft of the steering gear. This wedge engages the end of an abutment affixed to the gear housing. A spring means engages the end of the wedge and acts to cause a wedging action between the output shaft and the stud. This continuously forces the teeth of the gear set into proper engagement. As the teeth of the gear set wear, the spring will act to move the wedge transversely of the shaft and thus force the shaft to move along its longitudinal axis so that proper lash and meshload are maintained in the gear set. As is conventional in steering gears, the teeth of the gears are positioned in metal-to-metal engagement with substantially no lash when the gear is set for straight ahead driving of the vehicle. As the gears are moved to provide either a left or a right turn the meshload on the gears is decreased. At this time the wedge moves under the urging of the spring means into proper position if wear of the steering gears has occurred.

This arrangement also provides the advantage that the force multiplication means or wedge is in effect irreversible. The engagement of this force multiplication means or wedge with the stud or abutment affixed to the housing prevents axial movement of the output or sector gear shaft in either direction due to externally applied forces. Simultaneously, the invention provides a means for automatically and continuously adjusting the lash and meshload in the gear set to the proper values for optimum operation.

An object of the invention is the provision of a steering gear that includes an automatic lash and meshload adjuster that will automatically adjust the lash and meshload of the gears as the gears wear due to usage.

Another object of the invention is the provision of a steering gear that includes an automatic meshload and lash adjuster in which the gears of the steering gear are held rigidly in contact with one another during operation.

A further object of the invention is the provision of a steering gear in which an automatic meshload and lash adjuster is provided that includes an irreversible force multiplying mechanism.

Other objects and attendant advantages of the invention will become more apparent as the specification is considered in connection with the attached drawings in which:

FIGURE 1 is a longitudinal sectional view, partially in elevation, of the steering gear of the invention;

FIGURE 2 is a sectional view, partially in elevation, taken along the lines 2—2 of FIGURE 1;

FIGURE 3 is a side elevational view, partially in section, of a portion of the adjusting mechanism of the invention, FIGURE 4 is a side elevational view of the conical coiled spring employed in the invention;

FIGURE 5 is a schematic view of the gear set of the invention, and

FIGURE 6 is a load curve in inch-pounds of torque required to turn the gears through the angles shown in FIGURE 5.

Referring now to FIGURES 1 and 2, there is shown a steering gear 10 that includes a housing 11 having an input shaft 12 rotatably mounted therein by means of bearings 13 and 14. The input shaft 12 includes a worm portion, and a ball bearing nut 15 is mounted on the worm. Rotation of the input shaft 12 causes movement of the ball bearing nut 15 axially along the axis of the input shaft 12 and worm. The ball bearing nut 15 includes a rack gear 16 positioned along one side thereof. This ball bearing nut may be of the type shown in United States Patent 2,267,524, issued December 23, 1941, to H. Hawkins.

A sector gear 20 is mounted on or included as an integral part of an output or sector gear shaft 21 that is rotatably mounted within the housing 11 by means of bearings 22 and 23. The end of the output shaft 21 is connected to a pitman arm (not shown) or other suitable linkage member of a steering gear linkage system that is coupled to the steerable road wheels of an automotive vehicle. The output shaft 21 is so mounted within the bearings 22 and 23 that limited axial movement may take place relative to the housing 11.

It should be noted by reference to FIGURES 1 and 2 that the roots 27 of the teeth of rack 16 lie in a plane which is canted with respect to the longitudinal axis of the output or sector gear shaft 21 and with respect to a plane formed by the tops 28 of the teeth of the rack 16. Similarly, the roots 30 of the teeth 31 of the sector gear 20 form a segment of a conical surface rather than a cylindrical surface as may be formed by the tops 32 of these teeth. It can be understood from this description that shifting of the output or sector gear shaft 21 downwardly, as shown in FIGURE 1, increases the meshload and reduces the last between the teeth of the sector gear 20 and the teeth of the rack 16. Shifting of the output or sector gear shaft upwardly, as shown in FIGURE 1, decreases the meshload and increases the lash between the teeth of sector gear 20 and the teeth of the rack 16. The teeth of the sector gear 20 and the rack 16 need not be formed exactly as described above; all that is required is that the meshload and lash of the gears be a function of the axial position of the output or sector gear shaft 21.

As stated in the introductory portion of the specification, it is conventional to provide a means for providing zero or minimum lash and hence maximum meshload lash when the steering gear is in the on-center position. This means may comprise a center tooth 33 on the sector gear 20 that has a circular pitch greater than the circular pitch of the remaining gears in the sector gear. This condition could also be provided for by making the pitch circle of the sector gear 20 eccentric with respect to the center line of the output or sector gear shaft 21. In such an arrangement, the center of the pitch circle would be positioned nearer the rack 16 than the center of the output or sector gear shaft 20.

A means is provided for automatically maintaining the proper meshload and lash between the teeth of the sector gear 20 and the teeth of the rack 16 as the teeth wear due to usage of the steering gear. This means is generally designated by the numeral 34. It includes an abutment supported by the housing 11. This abutment takes the form of a stud or bolt 35 that is threaded into the cover 36 of the housing 11. The stud or bolt 35 extends into a bore 37 in the output or sector gear shaft 21 in a direction substantially parallel to the axis of this shaft. The main body portion 38 of the stud or bolt 35 is supported in a cylindrical support structure 41 of the cover 36. It is also rotatably supported within the bore 37 in the output or sector gear shaft 21 by means of a bearing 42. The stud or bolt 35 has a section of generally reduced diameter, as shown at 43, and the stud or bolt terminates in a flanged head 44 that has a substantially flat surface on the upper side thereof. The reduced section 43 and flanged head 44 of the bolt or stud 35 thus forms a T-section as viewed in either cross section or elevation.

A plunger or wedge member 45 that may be of generally cylindrical shape is positioned within an opening or bore 46 in the output shaft 21. The plunger or wedge member 45 includes a T-shaped slot 47 that extends throughout its length, and this T-shaped slot has a flat bottom surface 48 that engages the end of the flanged head 45 of the stud or bolt 35. As can be appreciated by an inspection of FIGURE 3, the flat bottom surface 48 of the slot 47 extends in a direction substantially perpendicular to the axis of the output shaft 21 and to the axis of the stud or bolt 35. The opening or bore 46 in the shaft 21, on the other hand, extends at a small angle to the bottom flat surface 48 of the slot 47. This angle is such that the distance between the bottom 48 of slot 47 and the lowermost portion of the plunger or wedge member 45 increases at the centerline of the bolt or stud 35 as the plunger or wedge member 45 is moved from the left to the right, as viewed in FIGURE 1. As can readily be appreciated by an inspection of FIGURE 1, the wedge action is provided by the fact that the opening or bore 46 is arranged with respect to the bottom 48 of the T-shaped slot 47 such that a section 51 of a wedge is formed by a section containing the centerline of the output or sector gear shaft 21, and the centerline of the plunger or wedge member 45.

This section 51 of the wedge is urged into engagement with the flanged head 44 of the stud or bolt 35 by means of a conical coiled spring 52 that is positioned within the bore of opening 46 in the output or sector gear output shaft 21. The line of action of this spring is in a direction generally parallel to the centerline of the opening or bore 46. The wedge thus provides a force multiplication means for the force exerted by the spring 52 and applied to the stud or bolt 35 and the output or sector gear shaft 21. The force exerted by the wedge surface, the bottom surface 48 of the T-slot 47 on the flanged end 44 of the stud or bolt 35 may be expressed as the force exerted by the spring 52 divided by the sine of the angle subtended between the line of action of the spring, or the centerline of the bore 46, and the bottom 48 of the T-slot 47. In a workable steering gear arrangement, this angle may be approximately 8° and it gives a force multiplication factor neglecting frictional effects of approximately 7:1. Or stated differently, the wedge provides a mechanical advantage of 7:1.

It can also be appreciated that the means 34 for providing the automatic meshload adjustment and the lash adjustment between the teeth of the sector gear and the teeth of rack 16 is in effect irreversible. The wedge angle is such that any forces due to road shocks delivered to the output shaft through the steering linkage are insufficient to move the plunger or wedge member 45 against the bias of the spring 52 and hence are insufficient to move the output shaft and the sector gear 20 in relation to the rack 16 on the ball nut 15. This mechanism thus provides a means for automatically adjusting the meshload and lash in a steering gear that is insensitive to and resists loads and shocks transmitted to the steering gear from the road wheels.

During assembly operations, the output shaft 21 and the cover 36 of the housing 11 are assembled together with the means 34 for providing the automatic adjustment of the meshload and lash between the teeth of the sector gear 20 and the rack 16. With the output or sector gear shaft 21 out of the housing 11, the stud 35 is threaded into a predetermined position with respect to the cover 36 and is locked in this position by means of a lock nut 56. The stud or bolt 35 and the cover 36 are then moved so that the stud 35 is inserted within the bore 37 in the output or sector gear shaft 21, and the spring 52 is placed within the opening or bore 46. The plunger or wedge member 45 is then inserted within the bore or opening 46 so that the T-shaped end formed by the reduced section 43 and the flanged head 44 are positioned within the T-shaped slot 47. A screw (not shown) is positioned within the threaded opening 57 in the output or sector gear shaft 21 and through the opening 58 in the cover 36. The screw is turned down so that the end of output or sector gear shaft 21 engages the support structure 41. This screw is turned down as the wedge member 45 s moved leftwardly, as viewed in FIGURE 1, against the bias of the spring. The output shaft 21 is then positioned within the gear housing 11 and the cover 36 of the housing is fastened down by means of bolts, one of which is shown at 61. When the cover has been properly bolted in place the screw is removed from the threaded opening 57 in the output or sector shaft 21 and from the opening 58 in the cover 36. The spring 52 will then move the plunger or wedge member 45 to the right and move the output shaft 21 downwardly, as shown in FIGURE 1, so that the teeth of the sector gear 20 and the teeth of the rack 16 engage each other with the proper meshload and with the proper lash. As pointed out previously, this is zero lash when the steering gear is in the on-center position as shown in FIGURES 1 and 2.

During the operation of the gear, the teeth of the sector gear 20 and of the rack 16 will wear to a considerable extent during long periods of use. In the absence of the automatic lash and meshload adjuster of this invention the effect of this wear would be to increase lash and decrease the meshload between the teeth of these gears. With the automatic lash and meshload adjuster of the invention, however, the meshload and the lash between the teeth of the gears will be maintained properly. This is accomplished by movement of the plunger or wedge member 45 to the right, as viewed in FIGURE 1, under the impetus of the spring 52. This movement will ordinarily occur when the steering gear is off of the center position where the minimum meshload and the minimum amount of separating forces of the gears is encountered. This may occur with approximately 20° rotation of the sector shaft. The movement of the plunger or wedge 45 to the right will move the output or sector gear shaft downwardly as viewed in FIGURE 1 to bring the teeth of the sector gear 20 into proper engagement with the teeth of the rack 16. When the steering is again returned toward the on-center position, the lash between the gears is decreased resulting in proportionally greater meshload. The invention will thus maintain the proper lash conditions in the gears of the steering gear and the proper meshload on the gears of the steering gear to provide proper driver feel.

Steering gears mounted in trucks and taxicabs may be operated for a great number of miles. It is not uncommon for these vehicles to be operated several hundred thousand miles. In such operation, the teeth of the sector gear 20 and the rack 16 may wear to the extent where the plunger or wedge member 45 may be moved all the way to the right, as shown in FIGURE 1, and thus not be capable of further lash and meshload adjustment. In this case, a manual adjustment can be made to re-establish the relative position of the plunger wedge member 45 and the stud or bolt 35 as shown in FIGURE 1. To do this the housing 11 can be provided with a plugged opening (not shown) that would permit access to the plunger or wedge member 45 and opening 46. The lock nut 56 would be loosened and the stud or bolt 35 would be turned to move it downwardly as viewed in FIGURE 1, as the plunger or wedge member 45 is moved to the left, as viewed in FIGURE 1. When the plunger or wedge member 45 reaches the position relative to the stud or bolt 35, as shown in FIGURE 1, the lock nut 56 is tightened. The automatic lash and meshload adjuster of the invention will then function properly for many more miles of use.

The present invention thus provides a reliable irreversible means for automatically adjusting the lash and meshload of the gears of a steering gear as the teeth of the gears wear during operation.

It will be understood that the invention is not to be limited to the exact construction shown and described, but that various changes and modifications may be made without departing from the spirit and scope of the invention as defined in the appended claims.

I claim:

1. In a gear set, a housing, a first shaft mounted in said housing, a gear mounted on said first shaft, a second shaft mounted for limited axial movement in said housing, a gear mounted on said second shaft in engagement with the gear mounted on said first shaft, said gears being shaped such that axial movement of said second shaft will adjust the lash between said gears, an automatic lash adjustment means coupled to said second shaft and said housing for automatically adjusting the lash between said gears, said automatic adjustment means including a wedge member slidably mounted in said second shaft and an abutment member carried by said housing, said abutment member extending into said shaft and engaging said wedge member, and force exerting means mounted in said second shaft and engaging said second shaft and said wedge member.

2. In a gear set, a housing, a first shaft mounted in said housing, a gear mounted on said first shaft, a second shaft mounted for limited axial movement in said housing, a gear mounted on said second shaft in engagenemt with the gear mounted on said first shaft, said gears being shaped such that axial movement of said second shaft will adjust the lash between said gears, an automatic lash adjustment means coupled to said second shaft and said housing for automatically adjusting the lash between said gears, said automatic adjustment means comprising a slidable spring urged wedge member slidably mounted in said second shaft and an abutment member mounted in said housing, said abutment member extending into said shaft and into engagement with said slidable spring urged wedge member.

3. In a steering gear, a housing, an output shaft mounted for limited axial movement in said housing, an input shaft mounted in said housing substantially perpendicular to said output shaft, a first gear connected to said output shaft, a second gear operated by said input shaft, said gears coupling said output shaft and said input shaft, the teeth of said gears being shaped such that axial movement of said output shaft will adjust the lash between said gears, and means for maintaining said gears in engagement and minimizing lash in said gears as said gears wear comprising, an abutment carried by said housing, and means engaging said abutment and said output shaft for urging said gears into meshing engagement, said means comprising a spring, an irreversible force multiplication means engaging said spring, said abutment and said output shaft for multiplying the force exerted by said spring and applying it to said output shaft and consequently through said output shaft to said gears, said irreversible force multiplication means comprising a wedge disposed within said output shaft transversely of the longitudinal axis of said output shaft.

4. In a steering gear, a housing, an output shaft mounted in said housing, a sector gear carried by said output shaft, an input shaft mounted in said housing, a rack gear carried by said input shaft capable of movement longitudinally of said input shaft when said input shaft is rotated, said last mentioned gear being in engagement with said sector gear, a mechanism for automatically adjusting the meshload between said gears as the teeth of said gears wear comprising, a fixed abutment member supported by said housing and extending into said output shaft, means for mounting said output shaft in said housing for limited axial movement, said gears being shaped such that axial movement of said output shaft will adjust the lash between said gears, a wedge shaped adjusting member positioned within said output shaft in a direction substantially perpendicularly to the longitudinal axis of said shaft, and spring means engaging said output shaft and said wedge shaped adjusting member for urging said wedge shaped adjusting member into engagement with said abutment member whereby the teeth of said sector gear are biased into engagement with the teeth of said rack gear and whereby said engagement will be maintained as the teeth of said rack gear and said sector gear wear.

5. In a steering gear, a housing, a rotatable input shaft mounted in said housing, a rack mounted for movement in an axial direction upon said input shaft when said input shaft is rotated, an output shaft rotatably mounted in said housing at substantially right angles with respect to said input shaft, a sector gear carried by said output shaft, said sector gear engaging said rack, said output shaft being mounted for limited axial movement in said housing, the teeth of said rack and the teeth of said sector gear being constructed such that axial movement of said shaft increases or decreases the lash of said gears depending upon the direction of movement of said output shaft, and means engaging said housing and said output shaft for urging said output shaft in a direction to decrease the lash in said gears to a minimum and to minimize the lash in said gears as said gears wear, said means comprising a wedge member slidably positioned within said output shaft in a direction substantially transverse to the axial movement of said output shaft, an abutment means engaging said housing and extending into said output shaft in a direction substantially parallel to the axial movement of said output shaft, said abutment means engaging the wedge surface of said wedge, and a spring means engaging said output shaft and the end of said wedge.

6. In a steering gear, a housing, a rotatable input shaft mounted in said housing, a rack mounted for movement in an axial direction upon said input shaft when said input shaft is rotated, an output shaft rotatably mounted in said housing at substantially right angles with respect to said input shaft, a sector gear carried by said output shaft, said sector gear engaging said rack, said output shaft being mounted for limited axial movement in said housing, the teeth of said rack and the teeth of said sector gear being constructed such that axial movement of said output shaft increases or decreases the lash of said gears depending upon the direction of movement of said output shaft, and means engaging said housing and said output shaft for urging said output shaft in a direction to decrease the lash in said gears to a minimum and to minimize the lash in said gears as said gear wear, said means comprising a slidable wedge member positioned for slidable movement within said output shaft, an abutment member including a stud affixed to said housing and extending into said output shaft in a direction substantially parallel to the longitudinal axis of said output shaft, the movement of said slidable wedge member being canted with respect to a line perpendicular to the longitudinal axis of said output shaft toward said abutment member at an angle equal to the wedge angle of said wedge member, said stud of said abutment member having an enlarged flanged end, said wedge member having a complementary slot for receiving said enlarged flanged end of said stud, and spring means positioned within said output shaft and engaging the end of said wedge member.

7. In a gear set, a housing, a first shaft mounted in said housing, a gear mounted on said first shaft, a second shaft mounted for limited axial movement in said housing, a gear mounted on said second shaft in engagement with the gear mounted on said first shaft, axial movement of said second shaft being capable of adjusting the lash between said gears, an automatic lash adjustment means coupled to said second shaft and said housing for automatically adjusting the lash between said gears, said automatic lash adjustment means comprising a slidable spring urged wedge member slidably mounted in said second shaft for movement in a direction substantially transversely to the longitudinal axis of said second shaft, said slidable spring urged wedge member including a wedge surface, and an abutment means carried by said housing and extending into said second shaft in a direction substantially parallel to the longitudinal axis of said second shaft, the wedge surface of said slidable spring urged wedge member engaging said abutment means.

8. In a gear set, a housing, a first shaft mounted in said housing, a gear on said first shaft, a second shaft mounted for limited axial movement in said housing, a gear on said second shaft in engagement with the gear on said first shaft, axial movement of said second shaft being capable of adjusting the lash between said gears, an automatic lash adjustment means coupled to said second shaft and said housing for automatically adjusting the lash between said gears, said automatic lash adjustment means comprising a slidable spring urged force multiplication means slidably mounted in said second shaft and an abutment member mounted in said housing, said abutment member extending into said shaft and into engagement with said slidable spring urged force multiplication means.

References Cited in the file of this patent

UNITED STATES PATENTS

| | | |
|---|---|---|
| 2,226,038 | Westcott et al. | Dec. 24, 1940 |
| 2,916,945 | Rittenhouse et al. | Dec. 15, 1959 |
| 2,936,643 | Smith et al. | May 17, 1960 |
| 2,953,932 | Lincoln | Sept. 27, 1960 |
| 2,984,121 | Folkerts | May 16, 1961 |
| 3,060,762 | Lutz | Oct. 30, 1962 |
| 3,113,469 | Muller | Dec. 10, 1963 |